United States Patent
Flory et al.

(10) Patent No.: US 7,882,016 B2
(45) Date of Patent: Feb. 1, 2011

(54) UTILIZING CASH FLOW CONTRACTS AND PHYSICAL COLLATERAL FOR ENERGY-RELATED CLEARING AND CREDIT ENHANCEMENT PLATFORMS

(75) Inventors: John E. Flory, Davis, CA (US); Edger Seth Wilson, Jr., Riverside, CA (US); Kathryn M. Trkla, Riverwoods, IL (US)

(73) Assignee: North American Energy Credit and Clearing Corp., Chicago, IL (US)

( * ) Notice: Subject to any disclaimer, the term of this patent is extended or adjusted under 35 U.S.C. 154(b) by 29 days.

(21) Appl. No.: 12/488,342

(22) Filed: Jun. 19, 2009

(65) Prior Publication Data
US 2009/0313162 A1    Dec. 17, 2009

Related U.S. Application Data

(63) Continuation of application No. 10/741,018, filed on Dec. 19, 2003, now abandoned.

(51) Int. Cl.
*G06Q 40/00* (2006.01)
(52) U.S. Cl. .............................. 705/37; 705/35; 705/39
(58) Field of Classification Search .................. 705/35, 705/36 R, 37, 38, 40, 39
See application file for complete search history.

(56) References Cited

U.S. PATENT DOCUMENTS

| 6,876,982 | B1 * | 4/2005 | Lancaster | 705/37 |
| 7,318,045 | B2 * | 1/2008 | Baecker et al. | 705/37 |
| 2001/0049649 | A1 * | 12/2001 | Baecker et al. | 705/37 |
| 2002/0120555 | A1 * | 8/2002 | Lerner | 705/37 |
| 2004/0024692 | A1 * | 2/2004 | Turbeville et al. | 705/38 |

(Continued)

OTHER PUBLICATIONS

Anonymous "Weather Hedging( Article discusses weather hedging, which is in fourth year as specialized sector of energy management business )" May 2001.*

(Continued)

*Primary Examiner*—Kelly Campen
(74) *Attorney, Agent, or Firm*—Foley & Lardner LLP (57) ABSTRACT

In accordance with the present invention, a financial instrument for the energy market is created. The financial instrument comprises a derivative instrument related to accounts receivable or accounts payable or both. In a preferred embodiment, the derivative instrument normally consists of two sets of linked swaps. In the first set, the seller exchanges two things with a third party: (i) the right for payment of accounts receivable within a month from the buyer is exchanged for the right to payment of such accounts receivable within a week from the third party; and (ii) the obligation to deliver energy to the buyer is exchanged for the obligation to deliver to the third party. The buyer exchanges the mirror image of those with a third party, to with: (i) the obligation to pay within a month to the seller is exchanged for the obligation to pay within a week to the third party, but the buyer receives financing to offset the cash flow ramifications; and (ii) the obligation to take delivery from the seller is exchanged with the obligation to take delivery from the third party. The swap can further be utilized to net payment obligations under multiple cash and forward commodity transactions between the buyer and the seller. Physical collateral is utilized as margin. In accordance with another aspect of the present invention, the process takes place on a 'clearing platform' for such energy transactions.

21 Claims, 5 Drawing Sheets

U.S. PATENT DOCUMENTS

2005/0097025 A1* 5/2005 Horton et al. ................. 705/37

OTHER PUBLICATIONS

Stavros, Richard "The fourth wave" Oct. 1, 2002 Public Utilities Fortnightly v140n18 pp. 4-5.*

Connors, Robert B "Weather derivatives allow construction to hedge weather risk" Mar. 2003 Cost Engineering v45n3 pp. 21-24.*

Edrich, Carole "Weather risk management" May 2003 Journal of Financial Regulation & Compliance v11n2 pp. 164.*

* cited by examiner

Figure 1. Schematic of Relationships

Figure 2. Invention Process Flow Diagram

Figure 3. Flow of Obligations and Cash

Below the dashed line is a financing transaction by NECC-F for PB that is separate from, but complements, the CFC operation.

Figure 4 Managing Portfolio Credit Risk

Figure 5

UTILIZING CASH FLOW CONTRACTS AND PHYSICAL COLLATERAL FOR ENERGY-RELATED CLEARING AND CREDIT ENHANCEMENT PLATFORMS

CROSS-REFERENCE TO RELATED PATENT APPLICATIONS

This application is a continuation of U.S. patent application Ser. No. 10/741,018, filed Dec. 19, 2003, and is incorporated by reference in its entirety.

FIELD OF THE INVENTION

The present invention relates to energy contracts.

BACKGROUND OF THE INVENTION

Energy markets need a more effective credit management and clearing solution to address the structural problems in the marketplace and satisfy more stringent regulatory oversight. Many bilateral energy transactions are over-collateralized. Liquidity for forward contracts, a type of commercial merchandizing transaction, is dropping. Trading activity is shifting from forward contract markets to the spot markets due to differences in collateral practices. This shift puts greater credit risks on physical market participants operating within an area coordinated by an independent transmission provider (ITP) or a gas pipeline. Also, due to the Sarbanes-Oxley Act of 2002, participants must fully disclose all material risks including potential credit exposures and valuations of open forward-market positions.

The federal regulatory agency responsible for overseeing energy markets, the Federal Regulatory Energy Commission, (FERC), 888 First Street, N.E., Washington, D.C. 20426, and the federal regulatory agency responsible for overseeing energy futures markets, the Commodity Futures Trading Commission (CFTC), Three Lafayette Centre, 1155 21st Street, NW, Washington D.C. 20581, are increasingly investigating the cash and derivatives markets trading activity. In February 2003, the FERC and CFTC held a joint conference on "Credit Issues in the Energy Markets: Clearing and Other Solutions" to address the credit problems facing the energy industry. In January 2003, the FERC staff issued a report "Commission Use of Natural Gas Price Indices" describing specific instances of trade price reporting abuses. The FERC and CFTC continue to aggressively pursue market participants who attempt to manipulate the market or falsely report their activities.

The energy markets can be categorized into cash markets and derivative markets. Cash markets are wholesale markets in which commercial parties buy and sell energy by entering into bi-lateral spot and forward contracts with one another. The parties to cash market transactions intend to make and take delivery of the commodity at the specified time and title transfer routinely occurs. Derivative markets, in contrast, are not intended to serve as merchandizing channels for the actual purchase and sale of a commodity; rather, derivatives—such as swap agreements or exchange-traded futures contracts—are principally used by market participants for risk management or speculation. Although a derivative contract may call for physical delivery of a commodity at a future date, delivery does not routinely occur. Many of the commercial interests who trade in the energy cash markets also trade energy-related derivatives to hedge the price or other risks associated with their cash market transactions or other business activities.

The cash energy markets can be categorized by tenor (contract length) into spot markets and forward markets. Spot contracts typically require the commodity to be delivered immediately or in the near future, whereas forward contracts typically require the commodity to be delivered at a specified time further in the future. Industry practice for delineating between spot versus forward markets can vary from commodity to commodity. For example, spot markets for natural gas are operated on a time scale from next day delivery to next month delivery. Spot electricity transactions range from next hour delivery to next day delivery.

There is no single cash marketplace for energy. Cash markets can operate wherever the infrastructure exists to conduct the transactions. That infrastructure can take different forms. ITPs provide electronic Internet-based systems that allow buyers and sellers to transact with one another anonymously in a centralized venue where trading occurs under auction market or stock-market style bidding procedures. Once the transaction is confirmed the parties are identified. Over-the-counter (OTC) markets in which individual brokers match buyers and sellers into bilateral contracts operate in parallel to the ITP-sponsored markets.

Cash market transactions are delivered by scheduling contractual volumes through the delivery provider. For natural gas, the delivery provider is the pipeline operator. Gas pipeline operators typically only operate markets for transportation services to move the commodity from the point of receipt to the point of delivery. Pipeline operators also offer pooled scheduling points to facilitate title transfer between buyer and seller.

For electricity, the delivery provider is either a control area operator (CAO) (for example, Cinergy Corp., 139 East Fourth Street, Cincinnati, Ohio 45202), or an ITP. An ITP coordinates the movement of electricity over transmission grids. It can be either a regional transmission organization (RTO) (for example, the PJM market, Valley Forge, Pennsylvania, covering all or parts of Delaware, Maryland, New Jersey, Ohio, Pennsylvania, Virginia, West Virginia and the District of Columbia) or an independent system operator (ISO) (for example, California ISO, P.O. Box 639014, Folsom, Calif. 95763-9014. covering California and other western states). In addition to operating markets for transmission services, ITPs may operate other markets. For example, PJM also operates a capacity market, a day-ahead spot energy market, an hour-ahead spot energy market, a regulation market and a spinning reserves market. These markets help to ensure that physical buyers such as electric utilities have access to products at competitive market prices to support the operational requirements of their business and help maintain the overall reliability and integrity of the transmission grid. The ITPs manage the operation, clearing, scheduling, settlement and billing for these markets.

In the cash markets for energy, the purchaser under a spot or forward contract is normally required to pay for the commodity after it has taken delivery. If the purchaser receives the commodity within a given month under multiple spot and/or forward transactions with a single seller, as is often the case, the purchaser would make a single payment to the seller approximately twenty (20) calendar days for electricity and twenty-five (25) calendar days for natural gas after the month end for the total amount that it received from the seller that month. For electricity, for example, this means that the purchaser has approximately six weeks to pay for commodity it received during the first week of a given month, five weeks to pay for commodity received the second week, etc. Although gas pipelines and ITPs have similar payment cycles, the amount of exposure from non-payment is greater for ITPs than for pipelines due to the number of markets an ITP operates.

Company downgrades by credit rating agencies combined with long post-delivery payment cycles have forced changes in credit and collateralization practices among market participants in the bilateral markets. Participants below investment grade when acting as buyers are often required to post the full notional value of an open (that is, pre-delivery) the contract plus any potential mark-to-market exposure in the event the contract needs to be liquidated. Sellers also may be required to post collateral if the market price has moved against the contracted price prior to making delivery of the underlying commodity.

Collateral requirements can be further compounded for participants who transact in multiple markets. For example, a producer of electricity who buys natural gas as fuel for his plant may be required to post collateral equal to the full notional value of a monthly gas contract. That producer will likely be a seller of electricity. Since electricity is a unique commodity in that it is 'instantly perishable' and cannot be stored, the seller cannot claim a lien against the commodity it has delivered, as it might in merchandizing transactions for storable commodities. The delayed payment cycle under cash contracts creates a post-delivery credit risk for the seller that the power purchaser may default on its obligation to pay for electricity it has already received and used. The increased gas collateral requirement combined with the delayed payment cycle for sales of electricity create greater cash flow challenges for the power producer/seller.

Increasing volumes transacted through cash markets create a credit risk cycle. Credit downgrades increase the probability of counterparty default and increase the risk that, during a default event, replacement of non-delivered commodity would occur during periods of high prices due to market scarcity or uncertainty. These risks become internalized through higher forward energy prices as more market participants fall below investment grade. To avoid these forward price risk premiums and the additional collateral required to carry an open cash contract to delivery, participants lean on the shorter term markets operated by the ITPs.

The ITPs are not as responsive in adjusting their credit policies and practices due to the time consuming and uncertain process of obtaining stakeholder consensus and regulatory approvals. In the event of a default within an ITP market, the loss is spread to all of the ITP participants through an allocation methodology prescribed in FERC approved tariffs. While participants may know the percentage of loss that would be allocated to them in the event of a default, they do not know the amount of potential exposure.

The Sarbanes-Oxley Act of 2002 requires full disclosure of any item that may have a material current or future effect on the financial condition of the company. Payment default within an ITP can be material not only for the ITP but also for the market participants transacting within the ITP who must absorb the loss. In 2001, two PJM market participants defaulted on payments totaling $4.1 million. At the extreme, a confluence of events occurred in 2001 that forced the largest two utilities in California to default on billions of dollars of payments and one of them to declare bankruptcy.

Another important aspect of financial reporting for companies that trade commodities is the market value of their open positions and their profit or loss resulting from posted settlement prices. In bilateral trading relationships within the energy markets, market and settlement prices are determined by independent surveys to establish price indices. These indices are used to value "open" forward contracts, that is, pre-delivery forward contracts, and may also be used as pricing references for energy-related derivatives transactions. Investigations by the FERC and the CFTC have identified instances of alleged false and fraudulent reporting of prices to the independent surveyors. Regulators also are seeking ways to ensure the integrity of price indices through proper and accurate reporting.

OTC brokers also will report to their clients the range of price activity in the forward markets based upon the volumes of trades occurring within their firm. Market participants will combine the price information received from several brokers to establish a forward price curve with which to value their open positions. As less trade volume occurs in the forward market and the tenor of trade activity decreases, the ability to accurately mark-to-market and report true value of open commodity positions in financial statements becomes increasingly difficult.

What is thus needed is a credit management and clearing platform for energy markets that reduces credit and default risk, reduces cash collateral requirements, reduces net energy costs while avoiding cost impacts on net buyers, insulates system reliability operations from financial distress, restores liquidity to forward markets, and provides reliable price indices.

SUMMARY OF THE INVENTION

A clearing platform for energy markets in accordance with the principles of the present invention reduces credit and default risk, reduces cash collateral requirements, reduces net energy costs while avoiding cost impacts on net buyers, insulates system reliability operations from financial distress, restores liquidity to the forward market segment of the cash market, and should result in reduced energy costs to consumers.

In accordance with the principles of the present invention, a financial instrument for the energy market is created. The financial instrument comprises a derivative instrument related to accounts receivable or accounts payable or both. In a preferred embodiment, the derivative instrument normally consists of two sets of linked swaps. In the first set, the seller exchanges two things with a third party: (i) the right for payment of accounts receivable within a month from the buyer is exchanged for the right to payment of such accounts receivable within a week from the third party; and (ii) the obligation to deliver energy to the buyer is exchanged for the obligation to deliver to the third party. The buyer exchanges the mirror image of those with a third party, to with: (i) the obligation to pay within a month to the seller is exchanged for the obligation to pay within a week to the third party, but the buyer receives financing to offset the cash flow ramifications; and (ii) the obligation to take delivery from the seller is exchanged with the obligation to take delivery from the third party. The swap can further be utilized to net payment obligations under multiple cash and forward commodity transactions between the buyer and the seller. Physical collateral— defined broadly to include production capacity that can be converted into a physical commodity—such as for example energy plant dispatchability, energy reserves or transmission capacity is utilized as margin. In accordance with another aspect of the present invention, the process takes place on a 'clearing platform' for such energy transactions.

DETAILED DESCRIPTION OF THE PREFERRED EMBODIMENTS

In accordance with the principles of the present invention, a new type of credit management and clearing system for wholesale energy markets is provided. The credit management and clearing system of the present invention reduces a seller's post-delivery default risk on a discrete spot or forward energy contract by shifting that risk to another party. In accordance with one embodiment of the present invention, the risk is shifted by use of a new derivative contract. In a further preferred embodiment, this derivative contract is a 'cash flow' swap contract with a third party (referred to herein as the 'clearing entity). In addition to cash flow contracts, the credit management and clearing system of the present invention utilizes physical collateral.

When used herein, 'energy markets' includes but it not limited to electrical and natural gas energy markets. Also, while technically the term 'power' means a source or means of supplying energy and 'energy' means the exertion of power or the capacity for doing work, when used herein power and energy are used interchangeably in the broadest sense.

A seller enters into one type of cash flow contract with the clearing entity in which the seller agrees to assign its account receivable from the purchaser in the energy market contract to the clearing entity in exchange for receiving a discounted amount from the clearing entity through a series of accelerated partial payments. The purchaser enters into another type of cash flow contract with the same clearing entity in which the party agrees to pay the purchaser's account payable to the seller (or the seller's nominee, which may be an affiliate of the clearing entity) when due in exchange for receiving a discounted amount from the purchaser of a series of accelerated partial payments. The clearing entity retains the spread between the discounted amount it receives from the purchaser and the lower discounted amount it pays the seller. Whereas traditional swaps typically involve an exchange of fixed versus variable payments between only two parties on set dates (with the variable payment linked to commodity spot prices or indexes), the cash flow contracts of the present invention effect an exchange or 'swap' of cash flow cycles among the original purchaser and seller on the cash market transaction and the clearing entity tied to the flow of accounts receivables and accounts payable.

Since all energy-related commodity transactions ultimately become a common commodity—accounts receivable and accounts payable—a cash flow contract in accordance with the principles of the present invention enables two counterparties to net their obligations to one another under multiple spot and forward contracts for multiple commodities in a manner that achieves superior protection under the Bankruptcy Code.

In accordance with another aspect of the present invention, a neutral clearing platform that applies to spot, forward and related derivatives markets is provided. The platform of the present invention better aligns collateral to offset each participant's credit risk on cash market transactions and derivatives transactions, including both pre- and post delivery risks on cash market transactions. The platform of the present invention utilizes physical collateral in the form of production capacity convertible into a commodity with the cash flow contracts of the present invention. This platform creates a call option right on such physical collateral to convert it to physical energy available for exchange in the wholesale energy market. The ability to readily convert non-cash collateral into cash is a common trait of margin deemed acceptable in the forward contract and derivatives markets. Thus, the revenues derived from such energy can be utilized. One example of convertible physical collateral particularly relevant to power grids is the collaterization of available generation capacity of power generators tied to bid stack power supply cost curves as acceptable collateral in lieu of cash to meet cash collateral requirements.

The platform of the present invention manages pre-delivery price risk of forward contracts and ultimately allows post-delivery credit exposure from spot and forward markets to be transferred to financial markets specializing in credit financing and risk, at the lowest possible cost. The platform of the present invention, by reducing financing costs, should result in lower energy costs to consumers.

Parties to spot and forward energy contracts can net their delivery and financial obligations under those contracts on a multilateral basis through novation to the operator of the clearing platform of both the delivery and financial obligations, reducing systemic default and delivery risk. When used herein, 'novation' refers to the act of substituting a clearing entity in place of the principal parties to the transaction, creating two separate transactions with the clearing entity. The platform of the present invention also utilizes 'cross contract netting'. When used herein, 'cross contract netting' refers to offsetting a party's obligations under multiple types of contracts, including spot, forward, cash flow and derivative energy-related contracts.

In the platform of the present invention, buyers may use financing to meet their accelerated post-delivery settlements on energy-related contracts. Accelerated settlement significantly reduces market risk; however, due to the time value of money and increased administration expenses accelerated settlement increases buyers' costs. A form of financing (through derivatives, insurance, and other methods) can be used to accelerate payment to net sellers while maintaining the current (monthly) collection cycle for buyers. Benefits of such credit financing include accomplishing accelerated payment to sellers at little or no incremental cost to buyers relative to current payment practices. Additionally, financial markets can assimilate price/longer term credit risk more efficiently than individual energy market participants or their delivery operators (RTOs, ISOs, and pipelines). Providing a counterparty (the clearing entity) to each side through novation can efficiently determine and manage the total marketplace portfolio risk.

Figure 1:
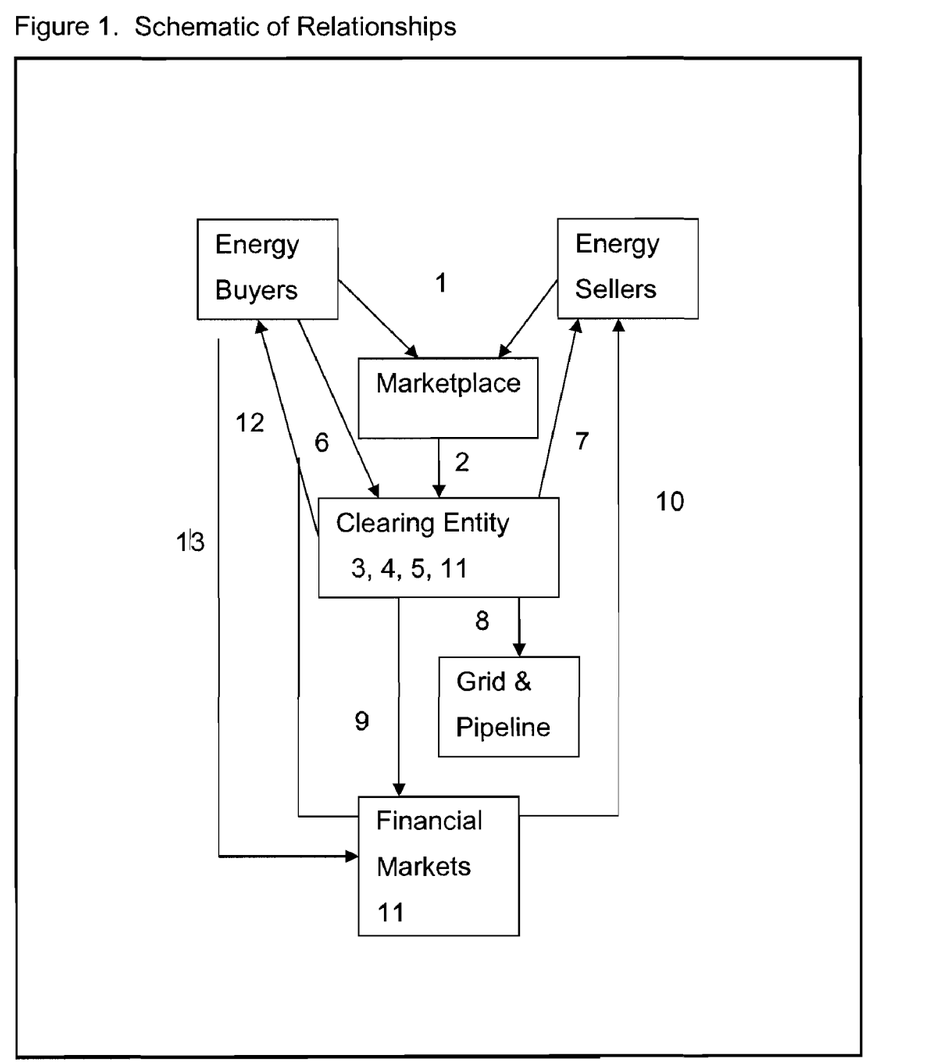
FIG. 1 is a schematic overview showing the participating entities in implementing a platform in accordance with the principles of the present invention.

FIG. 1 is a schematic overview showing the participating entities in implementing a platform in accordance with the principles of the present invention. Participants, including energy buyers and energy sellers trade in an energy marketplace. A neutral central clearing entity is provided. The neutral central counterparty 6 provides a payment to a broker. In one anticipated embodiment, brokerage services can be provided by an entity such for example as Marsh & McLennan Companies, 1166 Avenue of the Americas, New York, N.Y. 10036.

Energy buyers provide payments to the financial markets, which in a preferred embodiment could be providing payments through a clearing bank to a credit market. In one anticipated embodiment, clearing bank services can be provided by an entity such as for example the Harris Bank, 111 West Monroe, P.O. Box 755, Chicago, Ill. 60690. In one anticipated embodiment, credit market services can be provided by an entity such as for example Credit Suisse First Boston, Eleven Madison Avenue, New York, N.Y. 10010.

Figure 2:
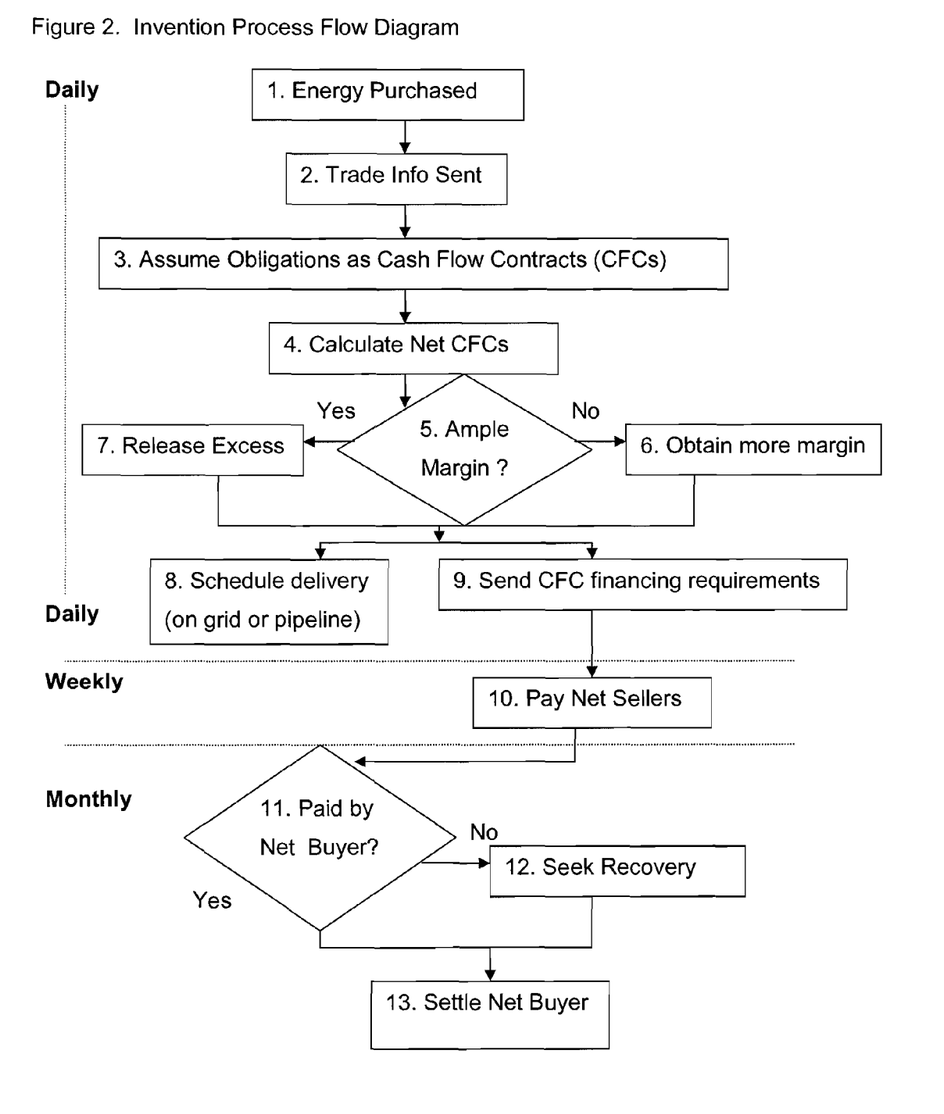
FIG. 2 is a process-flow diagram showing the operations of a platform in accordance with the principles of the present invention.

FIG. 2 is a process-flow diagram showing the operations of a platform in accordance with the principles of the present invention. Referring to both FIGS. 1 and 2, as an initial step, buyers and sellers find each other in an energy marketplace and complete a purchase of energy. The energy purchase agreement often follows standard terms for payment and delivery such as a master agreement for power promulgated by the Edison Electric Institute, (EEI) 701 Pennsylvania Avenue, N.W., Washington, D.C. 20004-2696 the natural gas contract promulgated by North American Energy Standards Board (NAESB), 1301 Fannin, Suite 2350, Houston, Tex. 77002 and the contract for financial derivatives promulgated by International Swaps and Derivatives Association ISDA, 360 Madison Avenue, 16th Floor, New York, N.Y. 10017.

Next, information about this purchase or trade (for example, the buyer and seller, the type of commodity, the price, the quantity, the delivery location, the time period (for example, day, week, month) of delivery, when payment is due, etc) is confirmed with the participants and then sent from the marketplace to a third party clearing entity.

In step 3, upon receipt of trade information the clearing entity (or its affiliate) assumes the appropriate financial and delivery obligations of the energy contracts from the buyer and seller. With respect to a buyer's spot delivery payment obligations, this is done by the energy seller purchasing appropriate cash flow contracts from the entity and the energy buyer selling appropriate cash flow contracts to the entity, as discussed above. Normally a clearing entity, such as the North American Energy Credit and Clearing Corporation, 1229 Villaverde Lane, Suite A, Davis, Calif. 95616 will arrange with the marketplace operator and buyer/seller to have these cash flow contract transactions occur automatically at the time of the original energy purchase. At this point the clearing entity has the obligation to pay the seller for energy delivery and to obtain payment from the buyer. In addition, unless such transactions are directly with the delivery operator as part of one of its markets (for example, RTO, pipeline), then for physical contracts requiring delivery (for example, EEI, NAESB), the clearing entity also has assumed the obligation to schedule with the delivery operator the flow of energy from the seller through the clearing entity to the buyer.

In step 4, the clearing entity compiles all the cash flow contracts and nets the delivery obligations for a given delivery period (for example, day, week, month) and financial payment obligations for a given settlement cycle (for example, day, week, month) for the appropriate energy commodities (for example, power, gas). Adjustments may be made for some netting to reflect that. For example, if an entity buys $100 of gas in a forward contract for July 2004 and sells $100 of power for July 2004, the clearing entity may only allow $80 of the power sale to be netted against the gas purchase because the market price movement of the two commodities are not perfectly correlated.

In step 5, buyers and sellers typically are required to post margin or collateral with the clearing entity in case they default on payment or delivery obligations and the market prices move in an unfavorable direction for them. In an embodiment of the present invention, total margin requirement would equal (i) initial margin on open forward contracts (for example, 3% of the value of the net amount of contracts purchased) plus (ii) variation margin to capture the market value of how the mark-to-market on previously purchased open forward contracts has moved against them, plus (iii) credit margin on purchases based on the amount of energy flowing to delivery during the relevant settlement period (for example, weekly) to cover their risk of default.

If the buyer's or seller's credit rating by rating agencies like Standard & Poor's, 55 Water Street, New York, N.Y., United States, 10041 or the clearing entity is high enough (for example, above investment grade), then in the prior art, such entities would have a monthly credit limit of transactions they could purchase without posting any collateral in an ITP market. In a preferred embodiment the net buyers will post an amount equal to (i) their default probability (as determined by the credit markets or the clearing entity), multiplied by (ii) their forecasted outstanding accounts payables to the clearing entity by the time payment is received during the settlement cycle.

If the net buyer's credit rating is low (for example, below investment grade), the net buyer will be asked to post additional margin or collateral. In the prior art, such net buyer in an ITO market would post collateral equal to 100% of the two highest months in the previous year. In the preferred embodiment such a net buyer would post (i) the full amount of the forecasted net purchases during the settlement period (for example, week) plus (ii) the time until payment is due (for example, 3 days) plus the time the clearing entity thinks it could obtain funds from the buyer (or some other entity) if the buyer defaults (for example, 3 days). Appropriate physical collateral, as well as financial collateral (for example, letters of credit, cash) can be used to meet the margin requirement (see discussion elsewhere). The clearing entity will apply an adjustment to the various types of margin or collateral that reflect the "haircut" (that is, discount) in cash value for a quick liquidation or appropriation of such collateral whenever needed.

In step 6, for those buyers or sellers whose margin or collateral posted with the clearing entity is less than the amount required by the clearing entity's margin policies, the clearing entity will seek more margin (or collateral). In step 7, for buyers or sellers whose margin or collateral posted with the clearing entity exceeds the requirement by more than a buffer amount defined in the clearing policies of the clearing entity, then the clearing entity will release that excess margin back to the buyer or seller.

In step 8, for the energy associated with the cash merchandising contracts underlying cash flow contracts of physical contracts that include a near term delivery obligation (for example, next day), the clearing entity will schedule delivery with the appropriate delivery operator (for example, RTO/ISO or gas pipeline) of the appropriate net amount across all contracts (for example, daily, weekly, monthly) of that energy type (for example, power, gas).

In step 9, the clearing entity will have arranged appropriate lines of credit and other financing equivalents with the financial markets to pay the sellers in advance of receipt of funds from the buyers. Each day the clearing entity will inform the appropriate financial market funders of the forthcoming amounts of financing based on that day's trading and cash flow contract activity.

In step 10, in a particular settlement cycle (for example, weekly) the clearing entity will instruct the appropriate financial market funders to wire funds to the net sellers based on the value of the cash flow contracts that settled during that settlement cycle.

In step 11, on another settlement cycle (for example, monthly) the net buyers are expected to pay the funds to the clearing entity (and/or its designated financial market funders). This step confirms whether such funds where timely received.

In the next to last step, if the funds from the net buyer were not received on a timely basis, then the clearing entity and/or appropriate financial market funders will seek recovery of funds. Initially, this will be contacting the net buyer to determine whether funds are coming very soon. If the delinquency/ default is not soon cured, then this may include accessing back-up lines of credit, credit derivatives and insurance as source of funds to restore the balance. Legal action may also be brought against the net buyer seeking recovery. In the final step, after funds have been received and confirmed, the clearing entity and appropriate financial markets funders will complete settlement of the net buyers' account for that settlement cycle.

In accordance with the present invention, collateral is expanded to include physical backstop and insurance equivalents. Buyers in cash energy markets have two inherent sources of value from physical collateral: the market value of capacity (or energy held in) reserve, and call options on energy delivered (including fuel delivered to generators) at fixed strike price, if the generator is called to run. Sellers in cash energy markets have two sources of collateral: fuel supplier transactions can be netted on a multilateral platform and fuel contracts or derivatives can be posted as collateral. Physical collateral increases (and decreases) in value with market price while cash does not; physical collateral improves operating reliability should a credit default occur (fuel or power still flows).

In accordance with one embodiment of the present invention, collateral is managed by use of CreditRisk+ risk assessment software available through Credit Suisse First Boston. This risk assessment includes dynamic default probabilities (DPs) using forward looking market indices, including uncertainty in DPs and energy prices. Continuous monitoring captures market moves (price) as well as participant moves (credit). Cash requirements can be offset by physical collateral, and insurance equivalents.

Benefits of the present invention to the energy market as a whole include a reduction in credit risk, improved physical reliability through improved credit risk management, and no necessary system changes or added administration at RTO. Benefits to net buyers include reduced RTO/OTC spot market prices due to lower risk with no change in current settlements, with use of physical reserves as collateral typically offsetting incremental cash collateral required of investment grade participants. Benefits to net sellers include collateral reductions (OTC) due to multilateral and cross contract netting with accelerated post delivery payments reducing receivables risk and improving cash flow.

Figure 3:
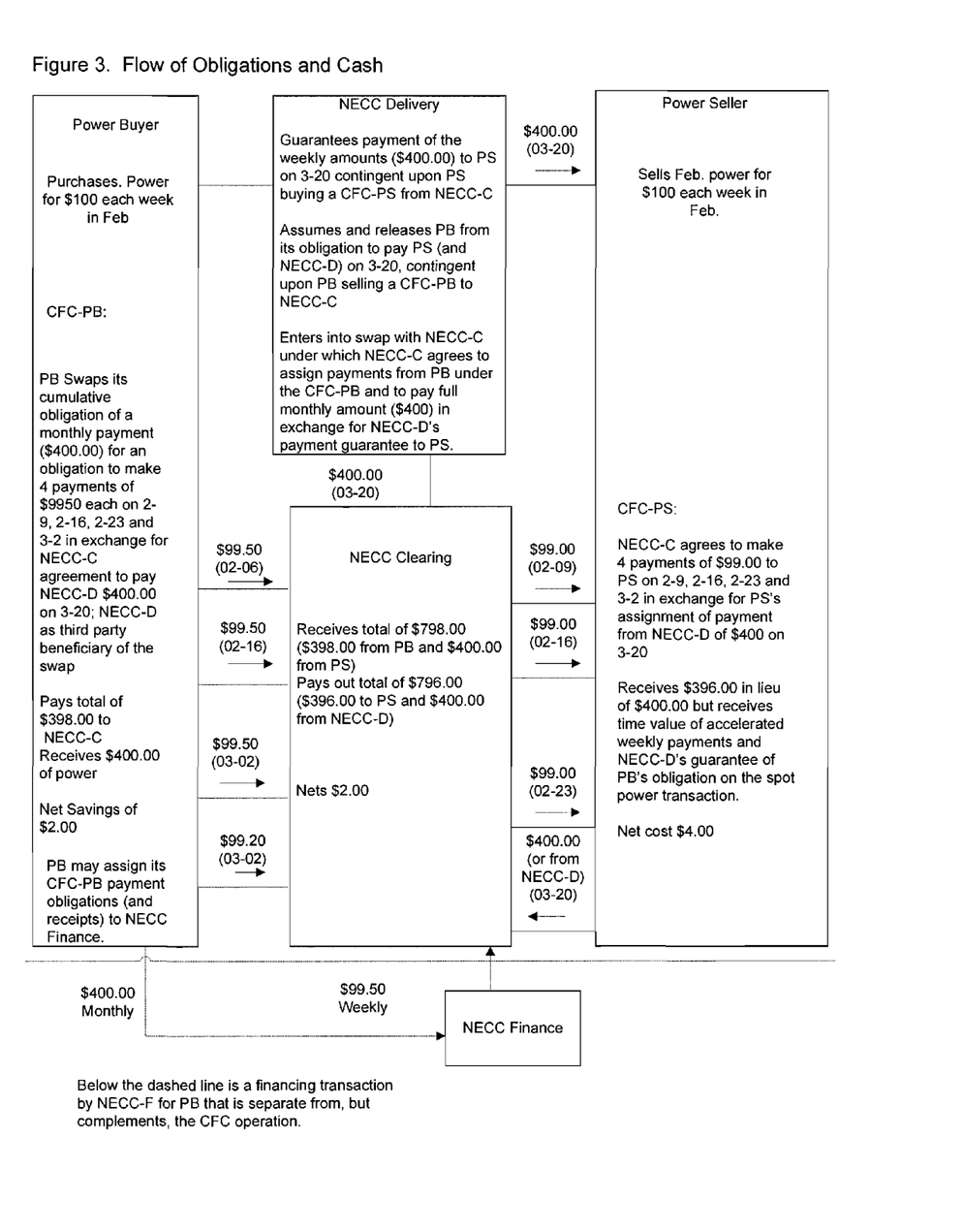
FIG. 3 is a schematic overview showing the flow of delivery and financial obligations of a platform in accordance with the principles of the present invention.

Referring to FIG. 3, a schematic overview showing flow of obligations and cash in a platform in accordance with the principles of the present invention is seen. In a preferred embodiment, the neutral central counterparty has two different subsidiaries: a delivery entity to manage the underlying commodity transaction and a clearing entity to manage the clearing of the cash flow contracts. In addition, a neutral finance entity is provided which provides financing to manage the time value of the difference in cash flows. In one embodiment, the clearing entity, as a subsidiary of the neutral central counterparty, will become a Derivatives Clearing Organization under the designation and oversight of the Commodity Futures Trading Commission (CFTC). In one embodiment, the delivery entity, also a subsidiary of the neutral central counterparty, will be regulated as an energy utility under the jurisdiction of the Federal Energy Regulatory Commission (FERC).

The delivery entity assumes a power purchaser's obligation to pay the power seller for purchases of electricity in the spot market in exchange for the power purchaser and power seller entering into separate cash flow contracts with the clearing entity. The clearing entity enters into one form of cash flow contract with the power buyer and another form of cash flow contract with the power seller.

In energy markets electricity is 'instantly perishable' once it has been received and consumed, and the payment convention is at least twenty (20) days in arrears for all electricity received during a given month. In accordance with the present invention, the risk that the power buyer could default on paying for electricity it has purchased and has already received is shifted to the delivery entity and the clearing entity.

In accordance with one aspect of the principles of the present invention, a set of related financial instruments for the energy markets is provided. Without limiting the scope of the present invention, such financial instruments for the energy markets will be referred to herein as cash flow contracts. The cash flow contracts are structured as a swap of cash flow payments and receivables between the power seller and a third party and a swap of payments and payables between the power buyer and the same third party and is designed to fit within special Bankruptcy Code provisions for swaps and forward contracts and the parties to such contracts, as such terms are defined in the Code.

In addition, in accordance with the present invention if the power buyer becomes bankrupt and defaults on its obligations under the cash flow contract, the clearing entity is afforded with better protections under the Bankruptcy Code (for example, exemption from the Code's automatic stay provision, ability to enforce contract termination rights and ability to enforce rights to receive margin and/or settlement payments) that are available to creditors who are parties to swap transactions and forward contracts with a debtor. By defining contracts based on the cash flow transactions rather than the underlying physical commodity, the cash flow contract can easily allow multi-lateral netting across various physical and financial energy transactions while obtaining the maximum bankruptcy protection, as discussed below.

The cash flow contracts in accordance with the invention normally exchange longer-term post-delivery cash flows of a standard underlying wholesale energy transaction for shorter-term cash flows. In a preferred embodiment, linked cash flow contracts exchange monthly cash flows of a standard underlying wholesale energy transaction for weekly cash flows. In additional embodiments, contracts of other post-delivery settlement cycles can be converted to standardized, nettable weekly cash flows within 2+ days of delivery—semi-monthly, bimonthly, and weekly settlements in which the cash flows longer than 2+ days after delivery. In additional embodiments, a set of daily cash flows can be exchanged for a weekly flow, a weekly flow for a set of daily flows, a set of fixed duration flows for a set of varying duration flows (for example, a set of flows at a fixed weekly flows for a set of partial payments at a various duration of monthly, bimonthly, and six monthly).

Referring again to FIG. 3, to better understand how a cash flow contract of the present invention operates, assume a power market operated by a Regional Transmission Operator (RTO) in which there is one investment grade power buyer and one power seller. In the underlying physical transaction, assume power seller sells and delivers $100 a Week (which accumulates to $400 a month) worth of power throughout February to power buyer. Normally the weekly (and partial week) dollar amounts will vary over the month; to simplify this example, a constant $100 a week for a 28 day month that starts on Monday (the beginning of the weekly delivery period) is used. For most months a partial week at the beginning of the month and a partial week at the end of the month would be necessary to match a monthly settlement.

Normally on March 20, power buyer would pay the RTO the total monthly settlement amount ($400) and the RTO would pay power seller ($400). The cash flow contracts of the present invention allow the power seller to receive cash (for example, $99) on a weekly basis. Under the cash flow contracts, the power buyer would be obliged to pay cash (for example, $99.50) on a weekly basis; however, the neutral central counterparty also can separately arrange financing at the election of the power buyer so that the power buyer can pay on its normal monthly cycle. This is elaborated below.

Through RTO tariff modifications, the delivery entity automatically becomes the counterparty to both parties of the cash merchandising transaction (through a de facto novation). Through RTO tariff changes, the delivery entity also automatically converts (during novation) the post-delivery component of the contracts into cash flow contracts between the clearing entity and power seller, and between the clearing entity and power buyer.

The delivery entity guarantees payment on March 20 to power seller of the full sale price (which is $400 monthly in this case), contingent upon power seller buying a cash flow contract from the clearing entity. Under the cash flow contract, the clearing entity would make weekly payments (4 of $99 each in this case) to power seller on 2-9, 2-16, 2-23, and 3-2 in exchange for power seller's payment of an amount equal to its accounts receivable from the delivery entity (of $400) on 3-20. The clearing entity is obligated to make these payments to the power seller even if the power buyer defaults on its payment obligations to the clearing entity under its linked cash flow contract. The power seller assigns to the clearing entity its right to receive the monthly payment ($400) from the delivery entity so that power seller has no net cash outlay on 3-20.

The delivery entity also assumes and releases power buyer from its post-delivery obligation of payment to the power seller (whether made through the RTO or to the power seller directly) on March 20, contingent upon power buyer selling a related cash flow contract to the clearing entity. Under the cash flow contract, the power buyer agrees to make weekly payments of $99.50 to the clearing entity on 2-9, 2-16, 2-23, and 3-2 in exchange for the clearing entity's agreement to pay the delivery entity $400 on March 20, which the delivery entity may use to meet the payment obligation it assumed of the power buyer under the power buyer's original cash market contract with the power seller. Thus, the delivery entity is a third party beneficiary of the power buyer's cash flow contract with the clearing entity. If the power buyer finances its payment obligations under the cash flow contract so that it can continue its normal monthly payment cycle, it assigns responsibility to the finance entity to make the power buyer's $99.50 weekly payments to the clearing entity in exchange for a payment of $400 on March 20 to the finance entity.

To tie all this together, the delivery entity enters into a swap with the clearing entity under which the clearing entity assigns its payments received from power buyer under the cash flow contract to the delivery entity in exchange for the delivery entity's payment guarantee to power seller.

There are a number of benefits to the present invention. Initially, the power seller receives cash weekly and is no longer subject to the receivable risk of the power buyer; that risk has been shifted to the clearing entity. Also, the power buyer has the option to pay on its normal monthly cycle. The finance entity will arrange financing (so the seller can be paid weekly while the buyer pays monthly) that not only provides the accelerated cash flow, but also absorbs the buyer's default risk. The power seller can net cash flow contracts associated with electricity sales with cash flow contracts associated with natural gas purchases to reduce the collateral it must post for natural gas. If a party has entered into both purchases and sales in the spot or forward market, it can net the weekly payments it receives under the cash flow contracts associated with its sales of power against the weekly payments it is obligated to make under the cash flow contracts associated with its purchases of power, and either pay (in the case of net purchases) or receive (in the case of net sales) the difference.

In addition, the power buyer can use unused credit limit and physical collateral on the cash flow contract in the spot market to purchase power and gas spot and forward contracts. Of course, there will be multiple buyers and sellers whose positions can be multi-laterally netted against each other to reduce collateral requirements. This contract definition is designed to achieve the best protection available under the U.S. Bankruptcy Code, as elaborated below.

The cash flow contracts should be protected under the Bankruptcy Code (the "Code") in two ways: first, the cash flow contract are designed to fit within the Code's definition of 'forward contract', and the cash flow contracts are designed for the status of both parties to the contract to fit within the Code's definition of 'forward contract merchant'; second, the cash flow contract should fit within the Code's definition of 'swap agreement', and the cash flow contracts are designed for the status of both parties to the contract to fit within the Code's definition of 'swap participant.' These protections under the Code are not mutually exclusive: a derivative can be both a swap and a forward contract; the Code definition of forward contract, in fact, includes swaps. These two protections are elaborated below.

'Forward Contract' is generally defined in the Code as a contract for the purchase, sale or transfer of a commodity or a service, right or interest that is or becomes the subject of dealing in the forward contract trade or product or byproduct thereof, with a maturity date of more than two days. Examples cited in the Code include repos and reverse repos, leases, swaps, hedge transactions, deposits, loans, options, allocated and unallocated transactions or any combination of such instruments. A cash spot contract is not a forward contract for purposes of the Code if the seller is obligated to make delivery on or within two days, but the two day minimum term requirement is not a constraint for the associated cash flow contracts, because the performance obligations under the cash flow contracts are tied to exchanges of cash flow payment obligations that extend beyond two days. In other words, the obligation at maturity under cash flow contracts is different (deliver/receive electricity vs. payment of swapped cash flows).

'Forward Contract Merchant' is generally defined in the Code as a person whose business consists in whole or in part of entering into forward contracts. 'Margin Payment' for purposes of the Code's forward contract provisions includes payments or deposits of cash or of securities or other property "commonly known in the forward contract trade as original margin, initial margin, maintenance margin, or variation margin, including mark-to-market payments, or variation payments." 'Settlement Payment' for purposes of the Code's forward contract provisions includes preliminary settlement payments, partial settlement payments, interim settlement payments, settlement payments on account, final settlement payments, net settlement payments or similar payment commonly used in the trade.

Under the Code, a Forward Contract Merchant can enforce contractual rights to liquidate open forward contracts with the debtor. A Forward Contract Merchant also can enforce contractual rights to receive margin on open forward contracts with the debtor. A Forward Contract Merchant can enforce contractual rights to offset mutual debts relating to margin and settlement obligations under forward contracts with the debtor. Finally, margin and settlement payments made by a debtor on forward contracts prior to filing of the bankruptcy petition cannot be unwound.

'Swap Agreement' is generally defined in the Code to cover rate swap agreements, basis swaps, forward rate agreements, commodity swaps, interest rate options, forward foreign exchange agreements, spot foreign exchange agreements, rate cap agreements, rate floor agreements, rate collar agreements, currency and cross-currency rate swaps, currency options and other similar agreements, and also includes options to enter into any of the foregoing. 'Swap Participant' is generally defined in the Code to mean an entity that has an outstanding swap agreement with the debtor at the time of filing of the debtor's bankruptcy petition.

Under the Code, a Swap Participant can enforce contractual rights to liquidate open swap contracts with the debtor. A Swap Participant also can enforce contractual rights to net out 'termination values' and 'payment amounts.' A Swap Participant also can enforce contractual rights to offset mutual debts relating to swap agreements, including the right to offset against cash, securities or other property held to guarantee the debtor's obligations under the swap. Finally, payments made by debtor on swap contracts prior to filing bankruptcy petition cannot be unwound.

Figure 4:
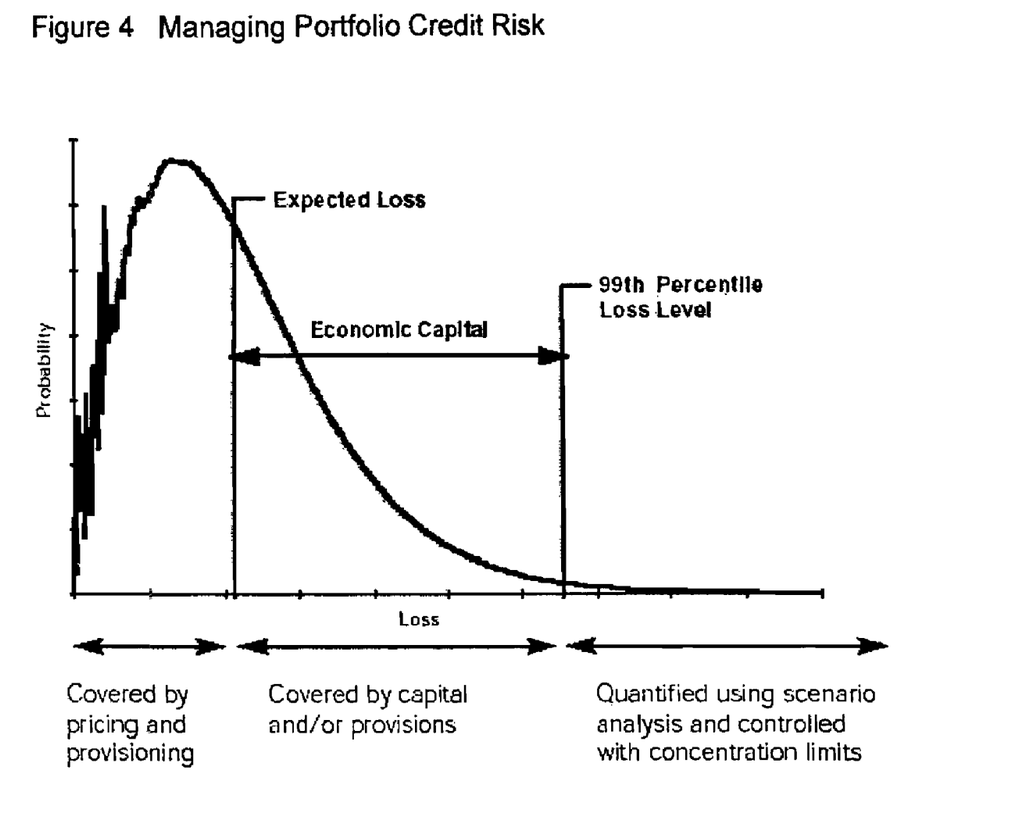
FIG. 4 is a graph showing a probability distribution of counterparty default losses from a portfolio of transactions with a number of counterparties.

FIG. 4 first shows a probability distribution of losses from a portfolio. This distribution is computed using the CreditRisk+ model of Credit Suisse First Boston. In particular, the expected loss should be captured on both the profit and loss statement and the balance sheet. In addition, the market participant should have adequate equity (economic capital) reserved on its balance sheet to cover up to a $99^{th}$ percentile loss according to standard industry practices.

Figure 5:
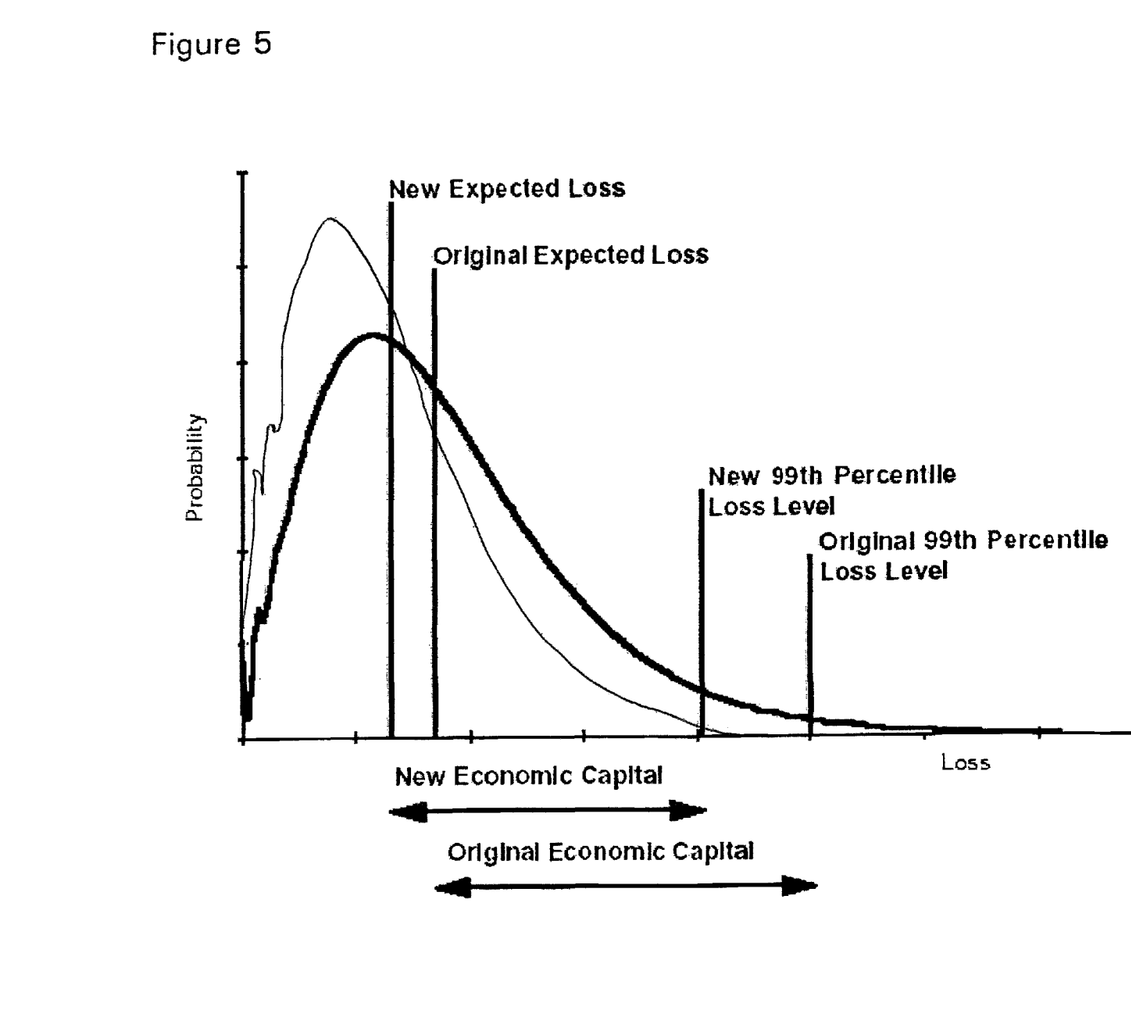
FIG. 5 is a graph showing how a platform in accordance with the principles of the present invention changes the counterparty loss distribution impact on a market participant.

FIG. 5 shows the financial impact of an alternate risk management strategy, such as one implemented in accordance with the present invention, versus the base risk management strategy of the prior art. The difference in expected losses can be reflected on the profit and loss statement and the balance sheet, and the difference in economic capital can be reflected on the balance sheet.

EXAMPLE

A comparison was made of the financial impact for 10 different market participants for a portfolio of energy transactions cleared in accordance with the principles of the present invention versus a prior art energy contract. One set of 5 market participants were investment grade (e.g., a BBB credit rating by Standard & Poor's) and hence were not currently posting collateral in their spot market transactions. A second set of 5 market participants had the same characteristics except they were below investment grade (e.g., a BB credit rating by Standard & Poor's) and hence were currently posting collateral in their spot market purchases.

Each type of credit rating included a set of 5 participants: (i) a trader, who also tried to have a flat position (that is, no net contracts, or one set of transactions offset another set of transactions, when netting across all markets) in its spot and forward market trading; (ii) a 100% net seller in the spot market of the RTO—this entity sold no power in forward markets and purchased no power to serve retail customers; (iii) a 100% net buyer in the RTO spot market—this entity owned no generation nor purchased any forward power contracts; rather it bought all of its power in the RTO spot market; (iv) a 20% net seller in the RTO spot market—this entity has both load and generation and most of its transactions are in the forward market; it has 20% excess power over it load requirements from the forward markets and its own generation to sell in the spot market; and (v) a 20% net buyer in the RTO spot market—this entity has both load and generation and most of its transactions are also in the forward market; however, it buys a net 20% of its delivered volumes in the RTO spot market to meet its load requirements.

As the prior art, the "best practices" as published by the Committee of Chief Risk Officers (CCRO) is utilized. The CCRO is a coalition of energy companies who develop tools to strengthen risk management and disclosure practices in the physical and financial trading and marketing of electricity and natural gas. CCRO can be contacted c/o Ogilvy Public Relations Worldwide, 1901 L Street, NW, Suite 300, Washington, D.C. 20036.

Table 1 set forth in the Appendix shows a table summarizing the balance sheet and profit & loss impacts before taxes for each of the 10 participant cases defined below. The impacts are normalized per 500,000 MWH of delivered volume per month. Thus, if an entity has a monthly delivered volume of 1,000,000 MWHs then the absolute dollar impact would be twice as great, although the relative percentage impact would stay the same. Table 1 shows that significant capital is freed up on the balance sheets of all market participants by implementing the NECC preferred embodiment of the present invention. It also shows a positive impact on the profit & loss for each participant.

Thus, it is seen that default risk is reduced when expected loss is reduced. Accelerated settlement reduces expected loss and dramatically reduces default risk. Applying equivalent gas contract or physical reserves to sellers' collateral requirements more than offsets the tighter collateral requirements, thereby freeing up significant cash. Additional cash is freed when generator's receivable position at the RTO is netted against collateral requirements. Generator risks can be offset by the value of their physical portfolio.

Thus, a cash flow contract in accordance with the invention allows netting of positions of cash spot market and forward market energy (power and natural gas) contracts, shifts credit risk to a neutral central counterparty and allows multi-lateral netting, reduces credit risk in the energy markets through a weekly (rather than monthly) cash settlement, facilitates financing so that net buyers can de facto keep a monthly cycle if they choose, permits the use of physical collateral to meet margin requirements, and obtains the strongest creditor protections available to the neutral central counterparty under the Bankruptcy Code on cash flow contracts in the event the counterparty on the transaction defaults, in particular; exemption from the Code's automatic stay provision, ability to enforce contract termination rights and ability to enforce rights to receive margin and/or settlement payments.

It should be understood that various changes and modifications to the preferred embodiment described herein would be apparent to those skilled in the art. For example, in addition to power and natural gas markets, coal, air emissions credits, power generation capacity, power transmission capacity, natural gas storage capacity, natural gas pipeline capacity, dispatchability of power generation or natural gas, demand response or reduction of electricity or natural gas demand during times of tight capacity situations or high market prices used as an alternative to electricity or natural gas capacity/supply, renewable energy, energy efficiency or energy conservation used as an alternative to new electricity or natural gas supply, and like energy markets can be utilized. In addition, while the preferred embodiment described herein utilizes a swap contract as the derivative instrument, futures contracts, forward contracts (with or without physical delivery), options, and like derivative instruments can be utilized. In addition, all types of energy marketplaces such as for example, exchange traded markets, over-the-counter (OTC) brokered bilateral markets, centralized markets offered by ITPs using electronic bulletin board quotation facilities or other types of markets offered by RTOs, ISOs, or pipeline operators, and like energy markets can be utilized. Still further, the tenor (or contract length) of the energy markets can be categorized not only as spot markets and forward markets, but also, on a more detailed basis, types of spot transactions include real-time, imbalance, balancing, hourly, intra-day, next day, day ahead; and types of forwards include weekly, balance of week, monthly, balance of month, quarterly, calendar, multiple year contracts, and like tenors. Such changes and modifications can be made without departing from the spirit and scope of the present invention and without demising its attendant advantages. It is therefore intended that such changes and modifications be covered by the appended claims.

APPENDIX

What is claimed is:

1. A system for managing financial instruments for energy markets comprising:
a processing unit; and
a storage device coupled to the processing unit having stored therein information for configuring the processing unit to manage financial instruments for energy markets, the information comprising instructions for:
facilitating collateral efficiency among buyers and sellers in an energy marketplace;
receiving information regarding an energy purchase agreement providing for an obligation of an energy seller to provide physical delivery by a physical delivery date of an energy commodity in exchange for payment of a purchase price for the energy commodity by an energy buyer on a payment date after the physical delivery date;
generating a seller cash flow contract (SCFC) with the energy buyer, derivative of the energy purchase agreement, between a clearing house and the energy buyer, who is the seller of the SCFC, wherein the clearing house is obligated to pay the SCFC seller (energy buyer) a value less than the energy purchase price prior to the payment date in exchange and has the right to receive the purchase price from the SCFC seller (energy buyer) on the payment date and further wherein the clearing house is obligated to provide physical delivery of the energy commodity to the SCFC seller (energy buyer) and has the right to receive the physical delivery of the energy commodity from the energy seller;
generating a buyer cash flow contract (BCFC) with the energy seller, derivative of the energy purchase agree-

TABLE 1

Participant Financial Impacts of NECC Proposed Credit/Clearing Solution per 500,000 MWH per month delivered volume

|  | Trader Flat Participant in RTO Spot Market | 100% Net Seller in RTO Spot Market | 100% Net Buyer in RTO Spot Market | 20% Net Seller in RTO Spot Market | 20% Net Buyer in RTO Spot Market |
| --- | --- | --- | --- | --- | --- |
| Investment Grade ||||||
| Balance Sheet - Standard Practice | $57,565,500 | $4,925,500 | $3,325,500 | $4,925,500 | $7,085,500 |
| Balance Sheet - NECC Practices | $8,355,490 | $(21,995,067) | $(254,910) | $(4,626,621) | $201,410 |
| Net Cost Savings | $49,210,010 | $26,920,567 | $3,580,410 | $9,552,121 | $6,884,090 |
| % Reduction | 85.49% | 546.56% | 107.67% | 193.93% | 97.16% |
| P&L - Standard Practice | $425,193 | $74,465 | $54,739 | $74,465 | $84,525 |
| P&L - NECC Practices | $114,540 | $(4,625) | $(1,676) | $13,578 | $21,524 |
| Net Cost Savings | $310,653 | $79,090 | $56,415 | $60,886 | $63,001 |
| % of Spot Notional |  | 0.40% | 0.28% | 1.52% | 1.58% |
| % of Delivered Notional | 1.55% | 0.40% | 0.28% | 0.30% | 0.32% |
| Non-Investment Grade ||||||
| Balance Sheet - Standard Practice | $399,325,500 | $3,325,500 | $43,325,500 | $3,325,500 | $53,325,500 |
| Balance Sheet - NECC Practices | $8,355,490 | $(20,666,667) | $7,715,490 | $(4,360,941) | $1,795,490 |
| Net Cost Savings | $390,970,010 | $23,992,167 | $35,610,010 | $7,686,441 | $51,530,010 |
| % Reduction | 97.91% | 721.46% | 82.19% | 231.14% | 96.63% |
| P&L - Standard Practice | $2,658,574 | $54,739 | $317,752 | $54,739 | $383,506 |
| P&L - NECC Practices | $114,540 | $4,110 | $50,732 | $15,325 | $32,006 |
| Net Cost Savings | $2,544,034 | $50,629 | $267,020 | $39,413 | $351,500 |
| % of Spot Notional |  | 0.25% | 1.34% | 0.99% | 8.79% |
| % of Delivered Notional | 12.72% | 0.25% | 1.34% | 0.20% | 1.76% | ment, between a clearing house and the BCFC buyer (energy seller), wherein the clearing house is obligated to pay the payment price on the payment date and has the right to receive payment of less than the purchase price on the payment date and the right to receive physical delivery of the energy commodity from the BCFC buyer (energy seller) by the physical delivery date and has the obligation to provide physical delivery of the energy commodity to the energy buyer;

netting physically delivery obligations and purchase price obligations at predetermined timer intervals;

communicating with a delivery operator system to schedule delivery of the energy commodity on the delivery date to the buyer.

2. The system of claim 1, wherein the energy commodity is natural gas.

3. The system of claim 1, wherein the energy commodity is electricity.

4. The system of claim 1 further wherein the deliver operator system is an independent transmission provider.

5. The system of claim 1 wherein the delivery and payment obligations are assigned to the clearing house via novation.

6. A system for managing financial instruments for energy markets comprising:
 a processing unit; and
 a storage device coupled to the processing unit having stored therein information for configuring the processing unit to manage financial instruments for energy markets, the information comprising instructions for:
 facilitating collateral efficiency among buyers and sellers in an energy marketplace;
 receiving information regarding an energy purchase agreement providing for an obligation of an energy seller to provide physical delivery by a physical delivery date of an energy commodity in exchange for payment of a purchase price for the energy commodity by an energy buyer on a payment date after the physical delivery date;
 generating a seller cash flow contract (SCFC) with the energy buyer, derivative of the energy purchase agreement, between a clearing house and the energy buyer, who is the seller of the SCFC, wherein the clearing house is obligated to pay the SCFC seller (energy buyer) a value less than the energy purchase price prior to the payment date in exchange and has the right to receive the purchase price from the SCFC seller (energy buyer) on the payment date and further wherein the clearing house is obligated to provide physical delivery of the energy commodity to the SCFC seller (energy buyer) and has the right to receive the physical delivery of the energy commodity from the energy seller;
 generating a buyer cash flow contract (BCFC) with the energy seller, derivative of the energy purchase agreement, between a clearing house and the BCFC buyer (energy seller), wherein the clearing house is obligated to pay the payment price on the payment date and has the right to receive payment of less than the purchase price on the payment date and the right to receive physical delivery of the energy commodity from the BCFC buyer (energy seller) by the physical delivery date and has the obligation to provide physical delivery of the energy commodity to the energy buyer;
 utilizing buyer physical collateral as margin with the clearing house for the buyer cash flow contract and utilizing seller physical collateral as a margin with the clearing house for the seller cash flow contract;
 netting physically delivery obligations and purchase price obligations at predetermined timer intervals; and
 communicating with a delivery operator system to schedule delivery of the energy commodity on the delivery date to the buyer.

7. The system of claim 6 further wherein the physical collateral comprises energy plant dispatchability or the rights to plant dispatchability.

8. The system of claim 6 further wherein the physical collateral comprises transmission capacity or the rights to transmission, including firm and non-firm, physical and financial rights.

9. The system of claim 6 further wherein the energy market comprises a natural gas market.

10. The system of claim 6 further wherein the physical collateral comprises energy reserves or the rights to use energy reserves.

11. The system of claim 10 further wherein the energy market comprises a power market.

12. The system of claim 11 wherein a monetary value is assigned to the physical collateral based upon spot markets.

13. The system of claim 12 further wherein the spot market comprises a pipeline market.

14. The system of claim 12 further wherein the spot market comprises an independent transmission provider market.

15. The system of claim 12 further wherein the spot market comprises a day head market.

16. The system for energy markets of claim 6 further wherein a term length of the buyer cash flow contract is different than a term length of the seller cash flow contract.

17. The system for energy markets of claim 6 further wherein the clearing house comprises a delivery entity that manages the underlying commodity transaction and a clearing entity that manages clearing of the cash flow contracts.

18. A system for managing financial instruments for energy markets comprising:
 a processing unit; and
 a storage device coupled to the processing unit having stored therein information for configuring the processing unit to manage financial instruments for energy markets, the information comprising instructions for:
 facilitating collateral efficiency among buyers and sellers in an energy marketplace;
 receiving information regarding an energy purchase agreement providing for an obligation of an energy seller to provide physical delivery by a physical delivery date of an energy commodity in exchange for payment of a purchase price for the energy commodity by an energy buyer on a payment date after the physical delivery date;
 generating an account receivable cash flow contract between the seller and a clearing entity;
 generating an accounts payable cash flow contract between the buyer and the clearing entity;
 generating a swap between a delivery entity and the clearing entity under which the clearing entity assigns accounts receivable under the accounts receivable cash flow contract to the delivery entity in exchange for a payment guarantee from the delivery entity to the seller
 netting physically delivery obligations and purchase price obligations at predetermined timer intervals;
 communicating with a delivery operator system to schedule delivery of the energy commodity on the delivery date to the buyer.

19. The system of claim 18 further comprising facilitating the delivery entity's assumption of an obligation of the buyer to pay the seller for purchases of the energy commodity in a spot market in exchange for the buyer and seller entering into separate cash flow contracts with the clearing entity.

20. The system of claim 18 further including communicating with a neutral finance entity that provides financing to manage the time value of the difference in cash flows.

21. The system of claim 20 further wherein the energy market is selected from the group comprising a coal market, an air emissions market, a power generation capacity market, a power transmission capacity market, a natural gas storage capacity market, a natural gas pipeline capacity market, a demand response market, a renewable energy market, an energy efficiency market, an exchange traded market, an over-the-counter market, a bilateral market, a brokered market, an independent transmission provider market, a regional transmission organization market, an independent system operator market, a pipeline market, an electronic bulletin board market, a spot market, a real-time market, an imbalance market, a balancing market, an hourly market, an intra-day market, a next day market, a day ahead market, a forward market, a weekly market, a balance of week market, a monthly market, a balance of month market, a quarterly market, a calendar market, a multiple year market, and combinations thereof.

* * * * *